United States Patent [19]

Tessaro

[11] Patent Number: 5,009,834
[45] Date of Patent: Apr. 23, 1991

[54] CURVILINEAR TRANSLATING LATCH AND LINKAGE ARRANGEMENT IN A CONTROL ROD DRIVE MECHANISM OF A NUCLEAR REACTOR

[75] Inventor: John E. Tessaro, Manor Boro, Pa.

[73] Assignee: Westinghouse Electric Corp., Pittsburgh, Pa.

[21] Appl. No.: 567,026

[22] Filed: Aug. 14, 1990

[51] Int. Cl.$^5$ ............................................. G21C 7/12
[52] U.S. Cl. .................................... 376/232; 376/228; 74/130
[58] Field of Search ................... 376/232, 228; 74/128, 74/130; 310/10-14

[56] References Cited

U.S. PATENT DOCUMENTS

| 3,882,333 | 5/1975 | DeWeese | 376/228 |
| 4,597,934 | 7/1986 | Bollinger et al. | 376/228 |
| 4,618,471 | 10/1986 | Defaucheux et al. | 376/228 |
| 4,640,811 | 2/1987 | Peletan | 376/228 |

Primary Examiner—Daniel D. Wasil
Assistant Examiner—Frederick H. Voss
Attorney, Agent, or Firm—Joseph C. Spadacene

[57] ABSTRACT

A latch and linkage arrangement in a nuclear reactor control rod drive mechanism includes a latch having an elongated body with opposite ends and opposite side edges and multiple latch teeth defined along one of body side edges between the opposite ends. The arrangement also includes a plurality of links. A first link pivotally connects with the latch body adjacent one end and is pivotally connected to an electromagnetic armature for applying a motive force to the latch body through the first link. Second and third links are pivotally connected to the latch body and to a support tube in parallel relationship to one another so as to define a parallelogram therewith such that when the motive force is applied to the body via the first link the latch body and thereby the latch teeth undergo curvilinear movement toward and away from a latching position.

10 Claims, 15 Drawing Sheets

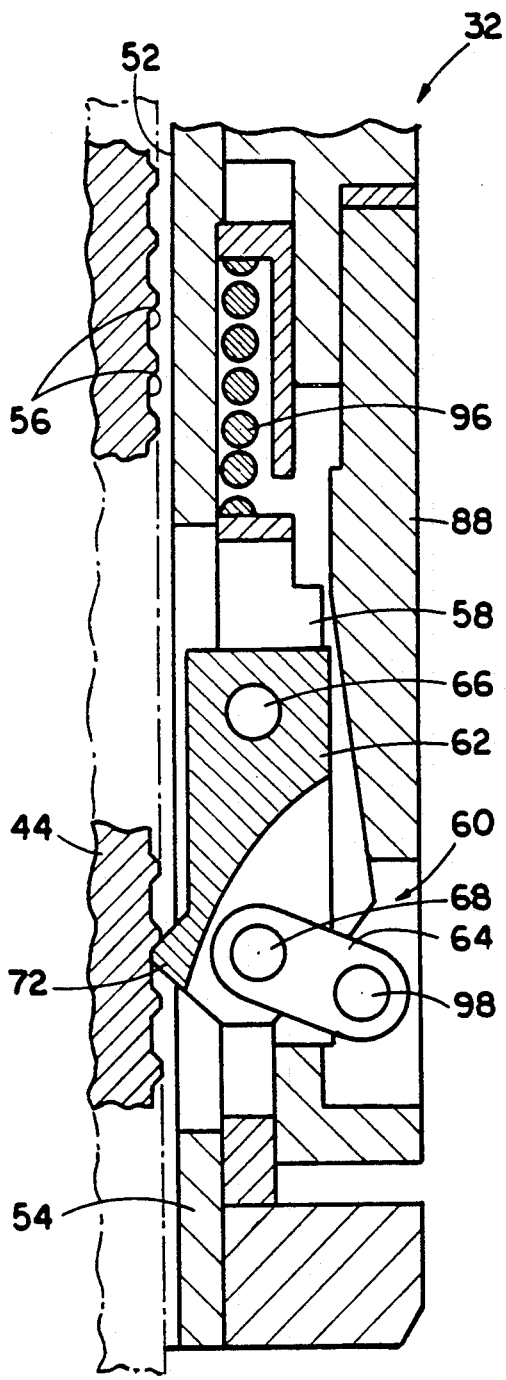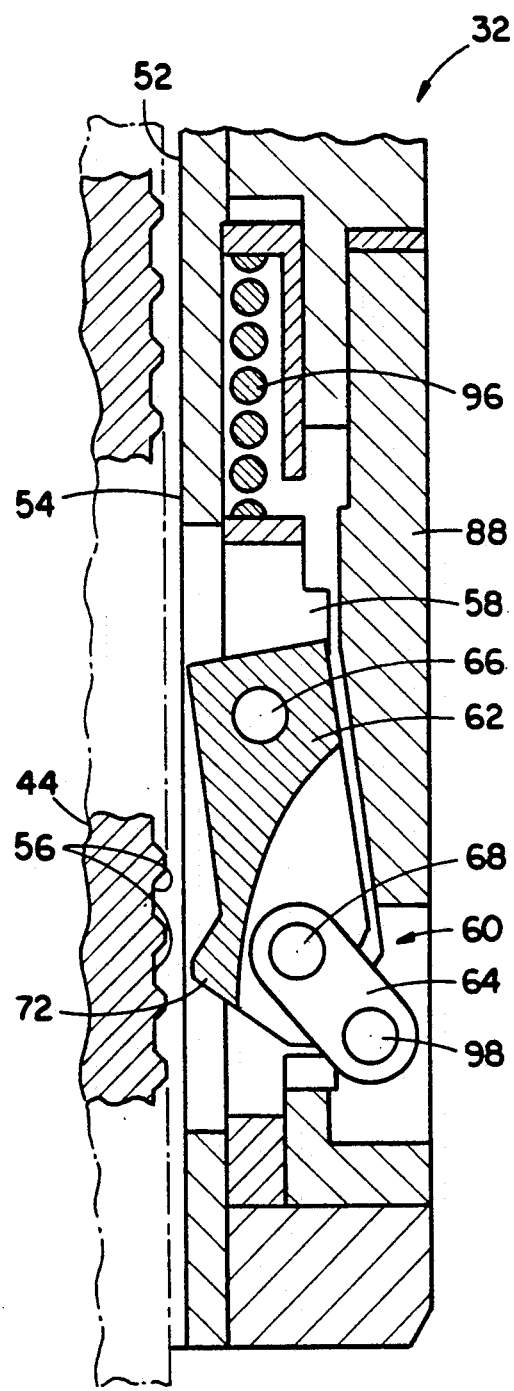
FIG. 6
(PRIOR ART)
FIG. 7
(PRIOR ART)

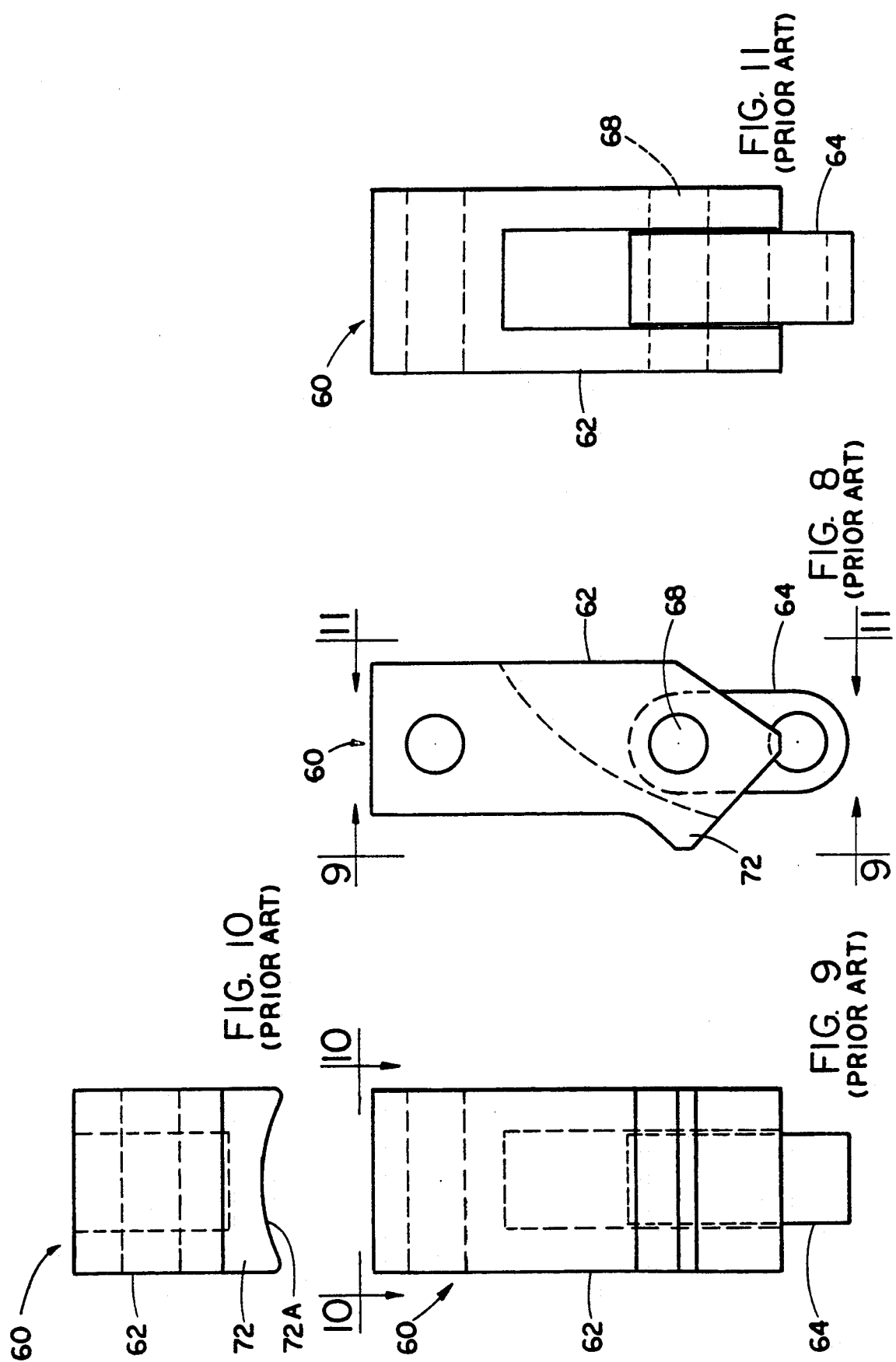

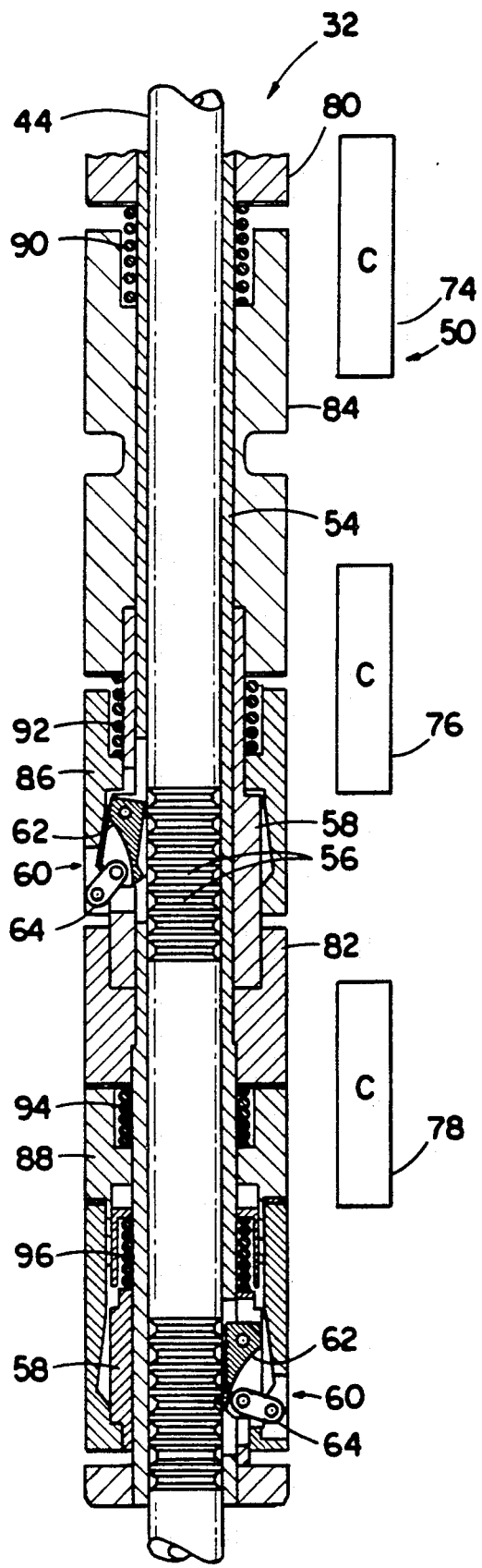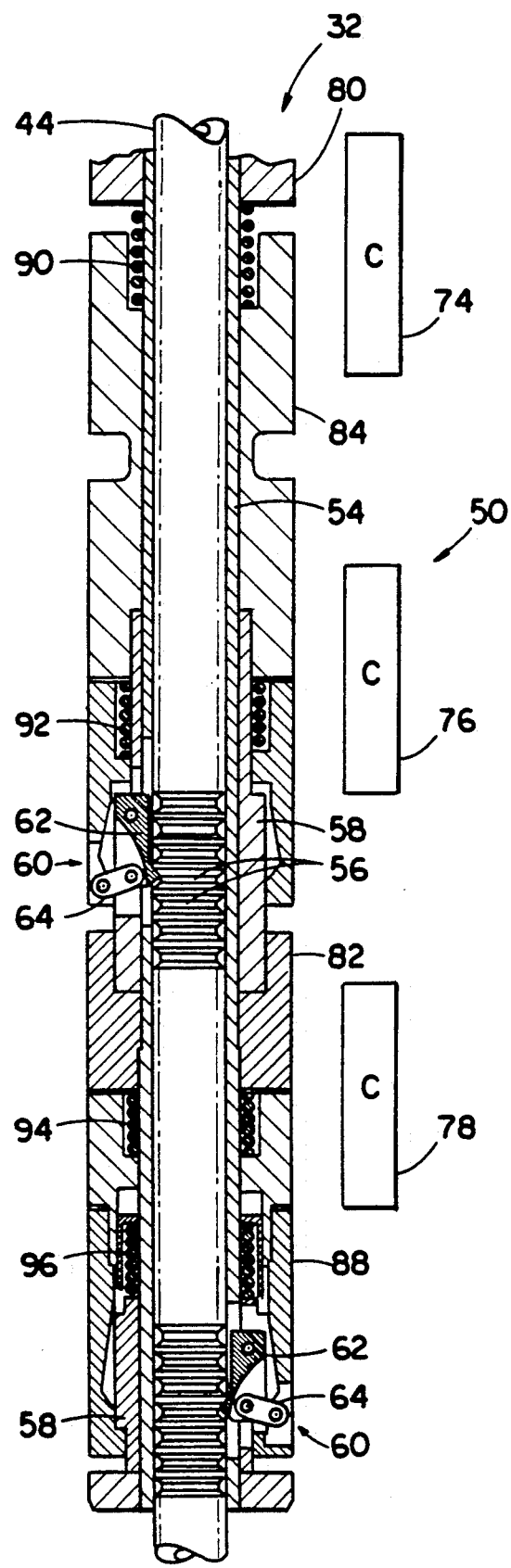
FIG. 12 (PRIOR ART)
FIG. 13 (PRIOR ART)

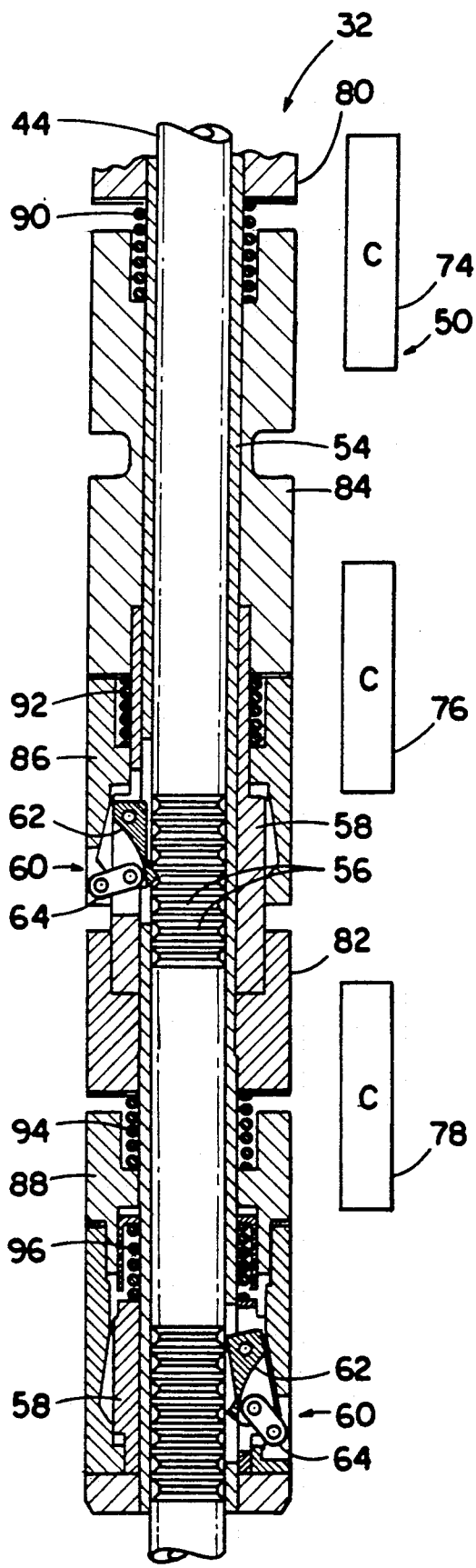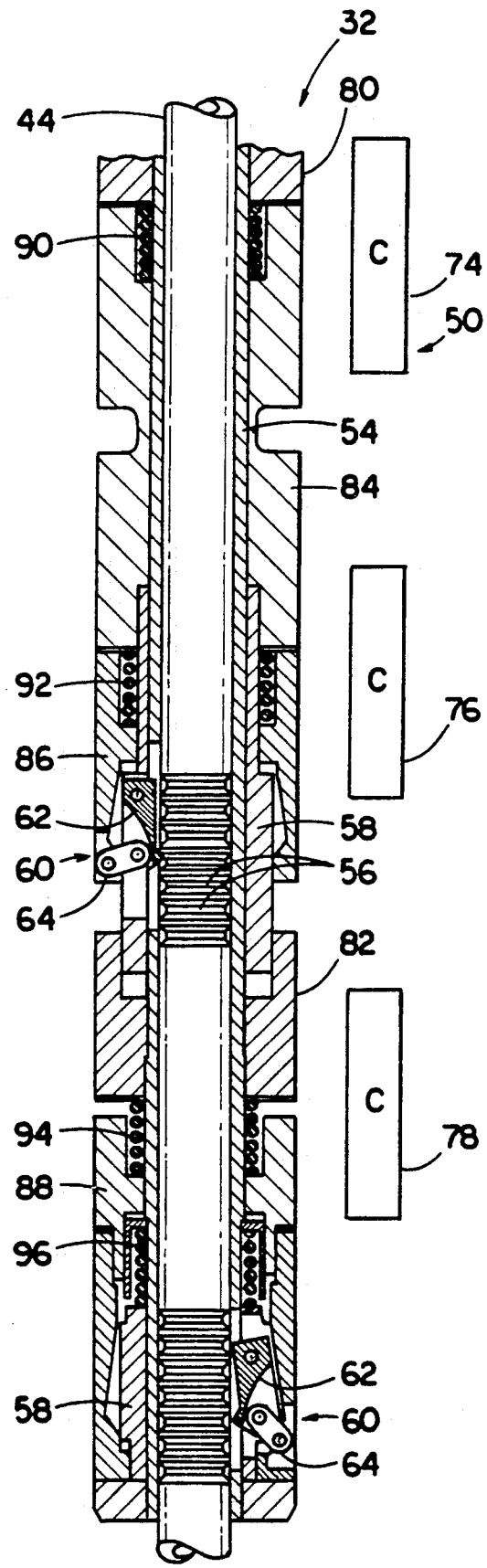
FIG. 14 (PRIOR ART)
FIG. 15 (PRIOR ART)

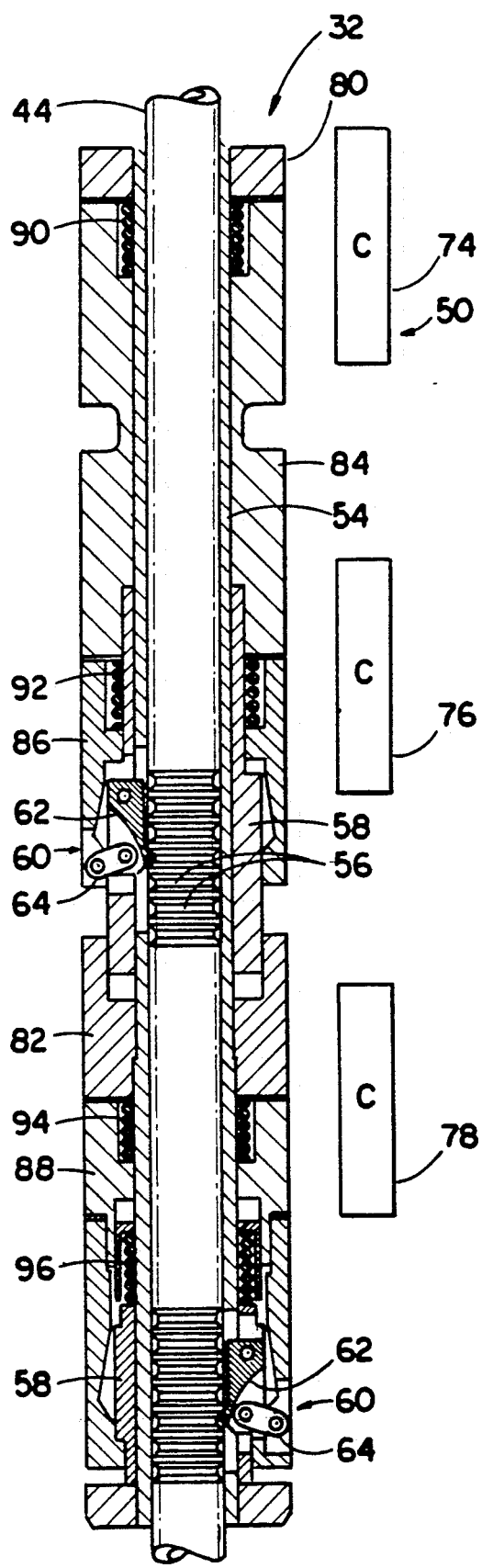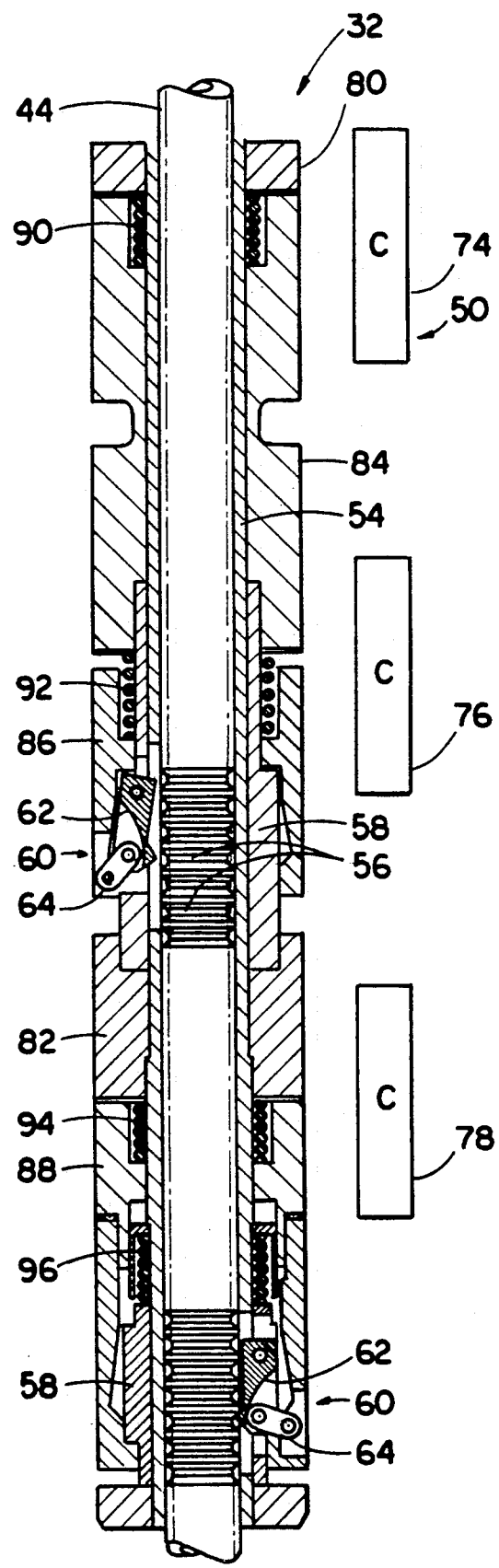
FIG. 16 (PRIOR ART)
FIG. 17 (PRIOR ART)

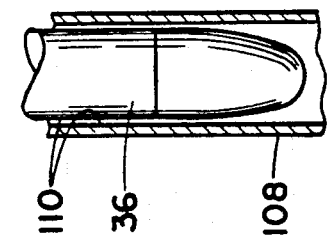
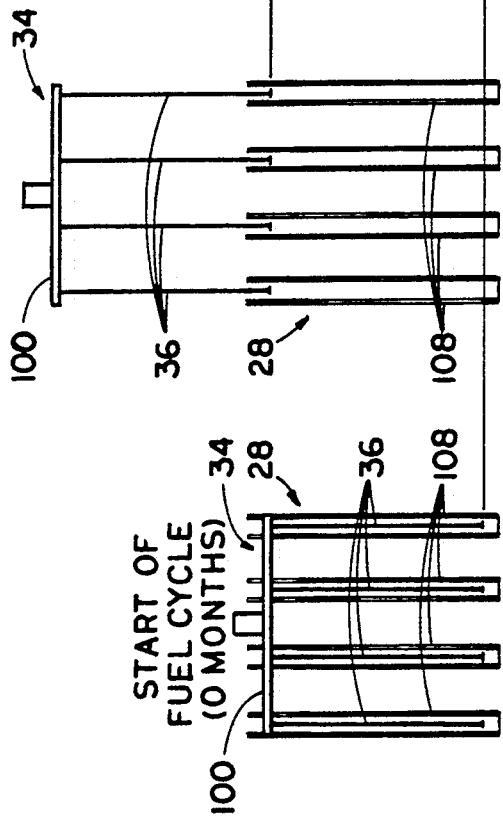
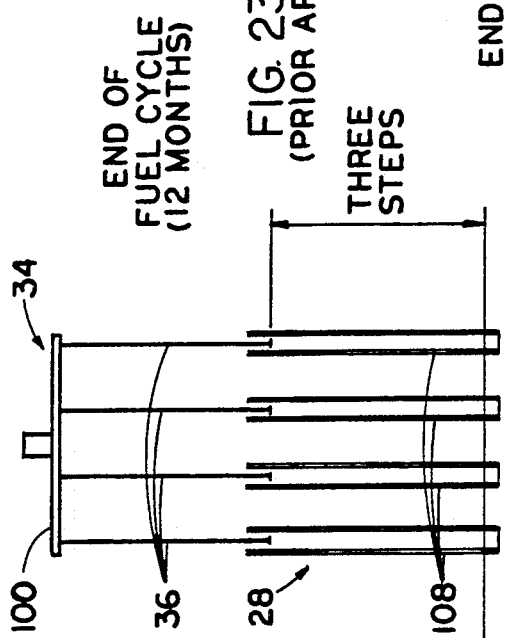
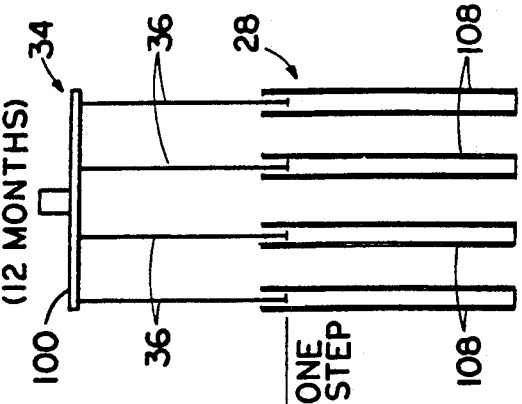
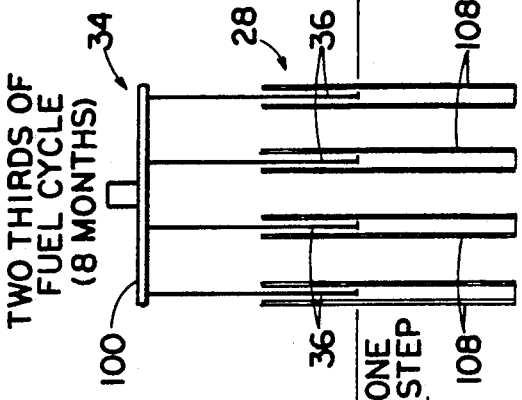
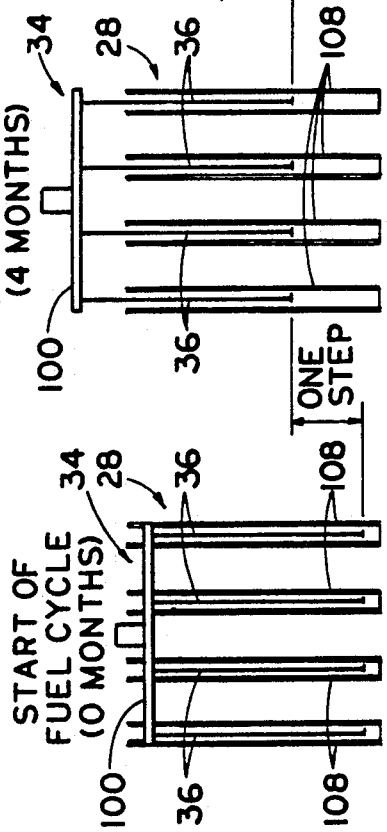

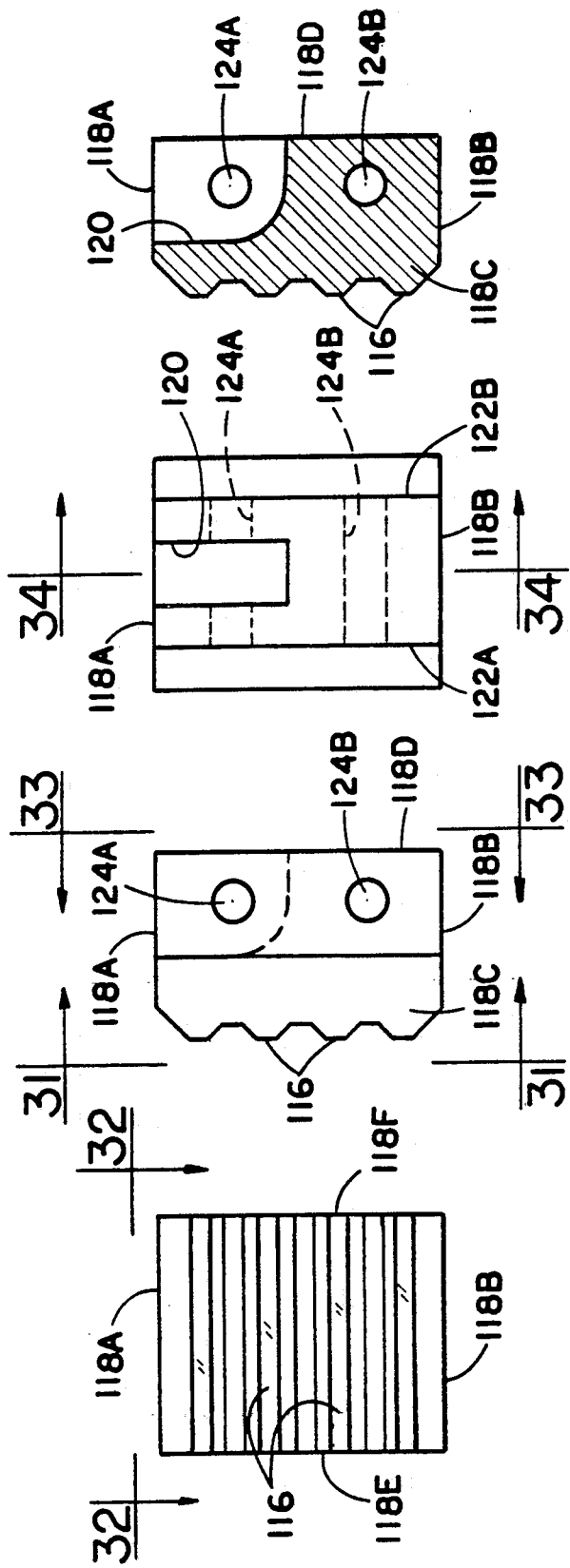

CURVILINEAR TRANSLATING LATCH AND LINKAGE ARRANGEMENT IN A CONTROL ROD DRIVE MECHANISM OF A NUCLEAR REACTOR

CROSS REFERENCE TO RELATED APPLICATION

Reference is hereby made to the following copending patent application dealing with related subject matter and assigned to the assignee of the present invention: "Single-Step Multiple Repositionings Of Control Rod Cluster Assembly During Each Nuclear Reactor Fuel Cycle" by John E. Tessaro, assigned U.S. Ser. No. 567,465 and filed Aug. 14, 1990.

BACKGROUND OF THE INVENTION

1. Field of the Invention

The present invention relates generally to nuclear reactors and, more particularly, is concerned with a curvilinear translating latch and linkage arrangement in a control rod drive mechanism of the nuclear reactor.

2. Description of the Prior Art

In a commercial nuclear reactor, heat, from which steam and ultimately electricity are generated, is produced by fissioning of a fissile material such as enriched uranium. This fissile material, or nuclear fuel, is typically contained within a nuclear core made up of a multiplicity of fuel rods supported in a plurality of nuclear fuel assemblies, coextensively arranged in a spaced parallel array.

Movable control rods are dispersed throughout the core to control the fission process. The control rods generally comprise a plurality of elongated rods containing neutron absorbing materials which fit in longitudinal openings defined in the fuel assemblies and among the fuel rods by guide thimbles of the fuel assemblies. The guide thimbles thus guide the control rods during their movement into and out of the core. Inserting a control rod into the core adds more absorber material and, hence, decreases the nuclear reaction; conversely, withdrawing a control rod removes absorber material and, hence, increases a nuclear reaction and thereby the power output of the core. The nuclear reactor core and the control rods are positioned within and supported by a reactor vessel through which a reactor coolant flows.

The control rods are supported in cluster assemblies moved into and from the nuclear core by control rod drive mechanisms which, in turn, are mounted by an upper internals arrangement located within the nuclear reactor vessel above the nuclear core. Typically, a reactor pressure vessel is pressurized to a relatively high internal pressure. The control rod drive mechanisms operate within the same pressure environment that exists within the reactor pressure vessel. Hence, the control rod drive mechanisms are housed within pressure housings of the upper internals arrangement which are tubular extensions of the reactor pressure vessel.

One of the more commonly used types of control rod drive mechanisms is referred to as a "magnetic jack". With this type of mechanism, the control rods are jacked into and from the nuclear core in a series of motions each involving moving the control rod a discrete incremental distance or "step"; hence, such movement is commonly referred to as stepping of the control rods. This magnetic jack type of mechanism is illustrated and described in U.S. Pat. Nos. to Frisch (3,158,766) and DeWesse (3,992,255) which are assigned to the assignee of the present invention.

This magnetic jack type of control rod drive mechanism includes three electromagnetic coils and armatures or plungers which are operated to raise and lower a drive rod shaft and thereby the control rod cluster assembly. The three coils are mounted about and outside of the pressure housing. Two of the coils actuate respective plungers of movable and stationary grippers contained within the housing. The third coil actuates a lift plunger connected to the movable gripper. Actuation of the movable and stationary plungers, in turn, operate sets of circumferentially spaced latches which grip the drive rod shaft having multiple axially-spaced circumferential grooves. The stationary gripper latches are actuated to hold the drive rod shaft in a desired axial position. The movable gripper latches are actuated to raise and lower the drive rod shaft. Each jacking or stepping movement of the control rod drive mechanism moves the drive rod shaft ⅝ inch. (1.58 cm). The jacking or stepping movement is thus accomplished by the operation of the three sets of axially spaced electromagnetic coils to actuate the corresponding stationary, movable and lift plungers so as to alternately and sequentially grip, move and release the control rod drive shaft of the respective mechanism.

The construction and stepping mode of operation of the magnetic jack type of control rod drive mechanism as used heretofore have certain drawbacks. The drawback associated with the construction of the control rod drive mechanism derives from the pivotal mounting geometry of the latches of the stationary and movable grippers of the mechanism. These latches each have either one or a pair of teeth which engage within either a single groove or a pair of adjacent grooves in the drive rod shaft. Because the latches pivotally move in arcuate paths toward and away from the drive rod shaft, the teeth are placed at locations on the latch body farthest from the pivotal axis of the latch. This latch teeth placement results in the generation of a moment load through the body of the latch which over time tends to cause cracking at the root of the teeth and eventual failure of the latch. Further, due to the limited number of teeth, the maximum being two, the effective wear life of the latch is limited.

The drawback associated with the mode of operation of the control rod drive mechanism derives from the particular scheme employed in repositioning of the rod drive shaft and thereby each control rod cluster assembly during each nuclear reactor fuel cycle. During normal reactor operation, the control rod drive mechanisms hold the cluster assemblies of control rods withdrawn above the reactor core within guide tubes extending upwardly from and in alignment with the guide thimbles of the fuel assemblies. The force produced by upward flow of coolant causes a surface area of the each control rod wall to contact and rub against the inside of its associated guide tube. Eventually, the wall thickness of the control rod at the area of contact will decreased below allowable limits requiring replacement of the control rod.

To avoid occurrence of rubbing contact wear at a single surface area of the control rod walls and thereby extend the useful life of the control rods, the drive rod shafts of the control rod drive mechanisms and thereby the control rods of the cluster assemblies are moved three steps at every refueling which occurs at the end of each fuel cycle of the nuclear reactor. Ideally, a one-step relocation is all that is needed to present a fresh surface area on the control rod to the portion of the guide tube where the wear is taking place. However, the inherent nature of the magnetic jack type of mechanism is that when it is actuated an occasional misstep will randomly occur in which the control rod is not moved. This presents an unacceptable degree of uncertainty for any given repositioning of the control rods as to whether or not the mechanism actually accomplished relocation of the control rods through one step if the cluster assemblies are only intended to be moved one step. If one-step relocation was not accomplished, or in other words a random misstep occurred, the additional exposure time of the original surface areas of the control rods for another complete fuel cycle at the same elevations would result in unacceptable wear at such areas. The unacceptable risk of a random misstep occurring is offset by the conventional practice of overcompensating and repositioning the control rods through a distance equivalent to three steps, instead of one step. Therefore, even if a one-step misstep occurs, the control rods will still be repositioned through two steps. The current strategy of repositioning the control rods in three-step increments handles the uncertainties of positioning in a simple way; by relocating the control rods an amount that is greater than any potential misstepping uncertainty.

The drawback of the three-step repositioning scheme is that the wear is still poorly distributed throughout the total available clad thickness of the control rods. As an example, assume that a particular nuclear plant has a control rod wear rate that uses 60% of the permissible wear thickness in one fuel cycle. With the three-step repositioning scheme, the control rods would be relocated every fuel cycle so that the permissible minimum level of wear thickness is not exceeded. This effectively "wastes" 40% of the wear thickness at that elevation of the control rods.

Consequently, a need exists for improvements in the construction and mode of operating the magnetic jack type of control rod drive mechanism employed in nuclear reactors so as to overcome the above-described drawbacks.

SUMMARY OF THE INVENTION

The present invention provides an improvement designed to satisfy the aforementioned needs. Particularly, the present invention is directed to a curvilinear translating latch and linkage arrangement in a control rod drive mechanism of the nuclear reactor. The invention of the cross-referenced patent application is directed to a method of operating a control rod drive mechanism for performing single-step multiple repositionings of a control rod cluster assembly during a single fuel cycle of the nuclear reactor.

The translating latch and linkage arrangement of the present invention employs a parallel linkage which permits the latch to move along a curvilinear path toward and away from a series of circumferential grooves on the drive rod shaft of the control rod drive mechanism. Because the mounting geometry of the arrangement of the present invention produces uniform movement of the latch toward and away from the drive rod shaft at every point along the length of the latch, a plurality of teeth can be deployed over the entire length of the latch without generating a moment load through the latch body. The additional number of teeth also serves to increase the wear life of the latch in proportion to the number of teeth.

Accordingly, the present invention is directed to a latch and linkage arrangement in a control rod drive mechanism of a nuclear reactor. The arrangement comprises: (a) a support member; (b) at least one latch including an elongated body having a pair of opposite ends and a pair of opposite side edges, and a plurality of latch teeth defined along one of the side edges of the body between the opposite ends thereof; and (c) a plurality of links, a first of the links pivotally connected to the latch body adjacent one of the ends thereof and pivotally connectable to a member for applying a motive force longitudinally of the body between the opposite ends thereof, and second and third of the links pivotally connected to the latch body and to the support member in parallel relationship to one another so as to define a parallelogram therewith such that when the motive force is applied to the body via the first link the latch body and thereby the latch teeth undergo curvilinear movement toward and away from a latching position.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 6 is an enlarged fragmentary view of the control rod drive mechanism illustrating the prior art latch and linkage arrangement extended toward the drive rod shaft to an engaged position with one of the circumferential grooves on the shaft.

FIG. 7 is an enlarged fragmentary view of the control rod drive mechanism illustrating the prior art latch and linkage arrangement retracted from the drive rod shaft to a disengaged position from one of the circumferential grooves on the shaft.

FIG. 8 is side elevational view of the prior art latch and linkage arrangement removed from the control rod drive mechanism.

FIG. 9 is a front elevational view of the latch and linkage arrangement as seen along line 9—9 of FIG. 8.

FIG. 10 is a top plan view of the latch and linkage arrangement as seen along line 10—10 of FIG. 9.

FIG. 11 is a rear elevational view of the latch and linkage arrangement as seen along line 11—11 of FIG. 8.

FIGS. 12-17 are fragmentary longitudinal sectional views of the control rod drive mechanism illustrating a sequence of steps in raising a drive rod shaft of the mechanism in stepping fashion relative to a stationary housing of the mechanism.

FIG. 21 is an enlarged fragmentary view of an end of a control rod positioned in a guide tube.

FIGS. 22 and 23 are diagrammatic views of the control rod cluster assembly and guide tubes receiving the control rods of the cluster assembly illustrating a sequence of stages in the prior art method of repositioning the cluster assembly by three steps during each fuel cycle.

FIGS. 24-27 are diagrammatic views of the control rod cluster assembly and guide tube assembly receiving the control rods of the cluster assembly illustrating a sequence of stages in the method of the invention of the cross-reference application of repositioning the cluster assembly by a single step each of a plurality of times during each fuel cycle.

FIG. 30 is a side elevational view of the latch of the improved latch and linkage arrangement of FIGS. 28 and 29.

FIG. 31 is a front elevational view of the latch as seen along line 31—31 of FIG. 30.

FIG. 32 is top plan view of the latch as seen along line 32—32 of FIG. 30.

FIG. 33 is a rear elevational view of the latch as seen along line 33—33 of FIG. 30.

FIG. 34 is a longitudinal sectional view of the latch taken along line 34—34 of FIG. 33.

DETAILED DESCRIPTION OF THE INVENTION

Figure 1:
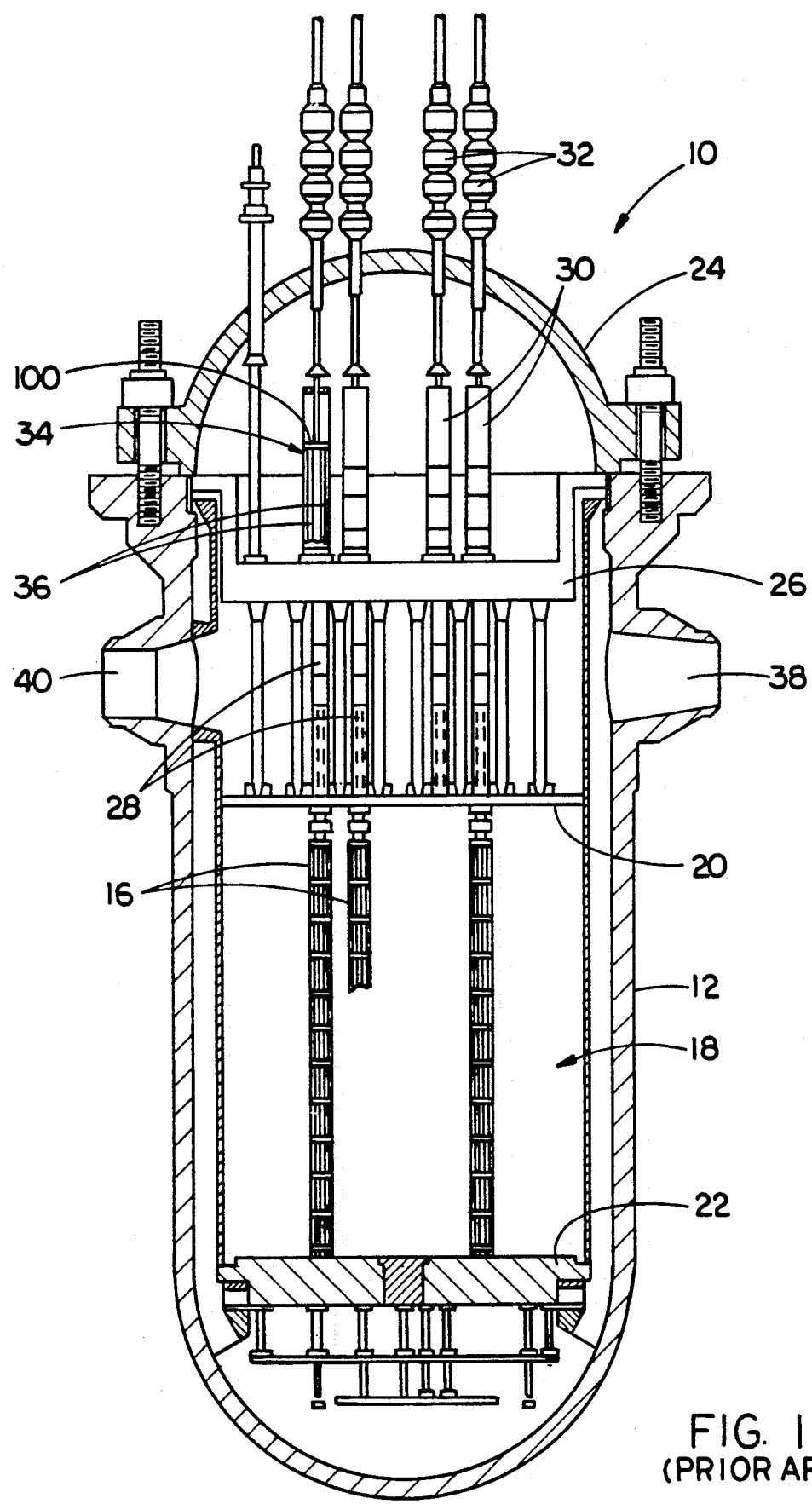
FIG. 1 is a longitudinal sectional view of a prior art nuclear reactor.
Figure 2:
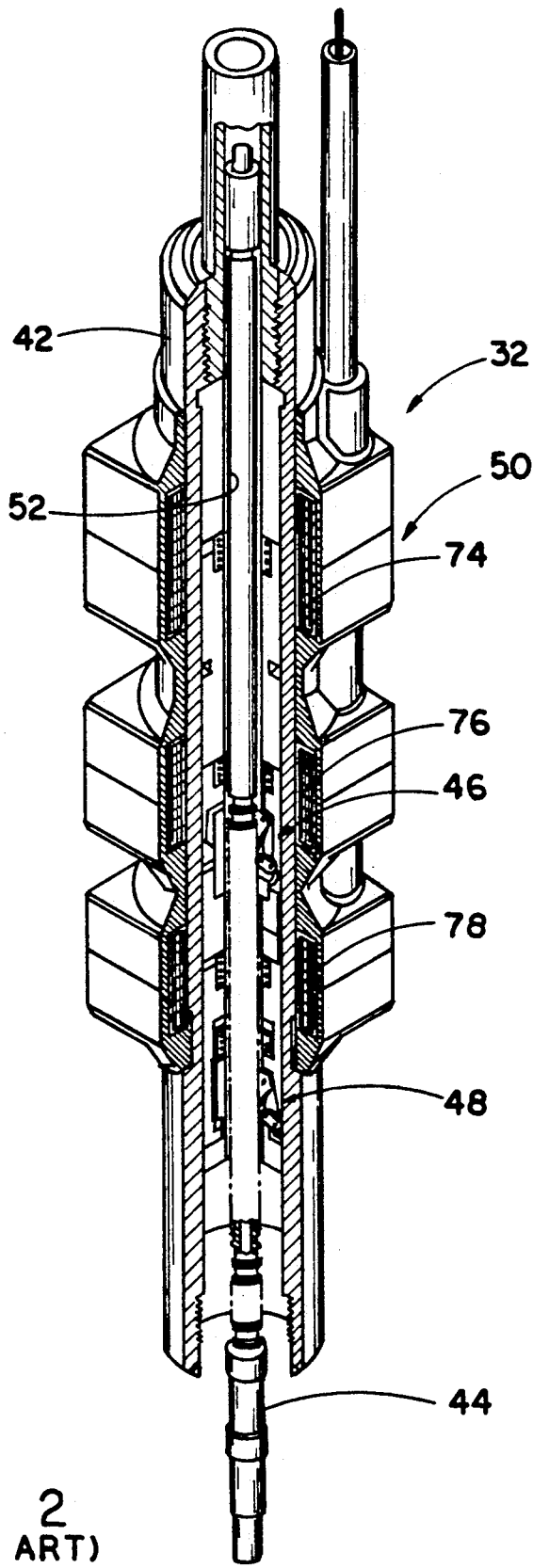
FIG. 2 is a longitudinal cutaway perspective view of a prior art control rod drive mechanism of a nuclear reactor.
Figure 3:
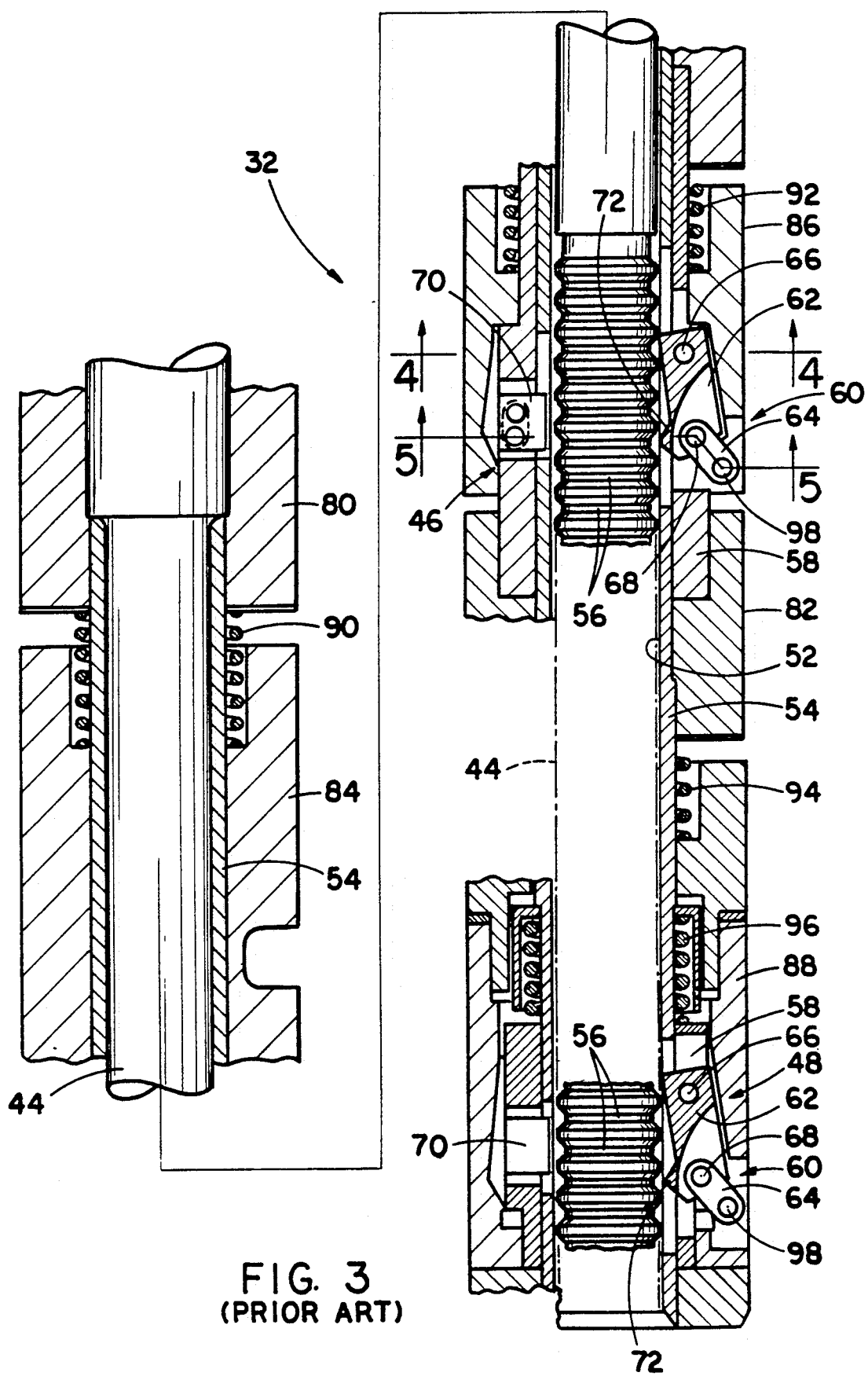
FIG. 3 is an enlarged fragmentary longitudinal sectional view of the control rod drive mechanism of FIG. 2.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

Prior Art

Referring now to the drawings, and particularly to FIG. 1, there is illustrated a prior art nuclear reactor, generally designated 10. The nuclear reactor 10 includes a reactor vessel 12 containing a core barrel 14 which houses a plurality of nuclear fuel assemblies 16 defining a nuclear core 18. The fuel assemblies 16 extend and are supported in a side-by-side parallel spaced array between upper and lower core plates 20, 22 of the core barrel 14. The nuclear reactor 10 also includes a closure head 24 enclosing the top of the reactor vessel 12 and an upper support plate 26 mounted within and across the upper portion of the vessel 12 spaced above the upper core plate 20.

Further, the nuclear reactor 10 includes a plurality of guide tube assemblies 28 supported by and extending between the upper core plate 20 and the upper support plate 26 in alignment with the fuel assemblies 16. Extensions 30 of the guide tube assemblies 28 are supported by and extend between the closure head 24 and the upper support plate 26. A plurality of control rod drive mechanisms 32 mounted to the closure head 24 movably support a plurality of control rod cluster assemblies 34 (see also FIG. 31 and 32) within the guide tube assemblies 28 and their respective extensions 30. The control rod drive mechanisms 32 are operable to lower the control rod cluster assemblies 34 toward the fuel assemblies 16 so as to insert control rods 36 (FIG. 31) into the fuel assemblies 16 for reducing the power output of the core 18.

The reactor vessel 12 has inlets 38 and outlets 40 (only one of each being shown in FIG. 1) through which coolant flows into and from the reactor vessel 12. The inlets 38 communicate with the exterior of the core barrel 14, whereas the outlets 40 communicate with the interior of the core barrel 16. Coolant flows into the vessel 12 through the inlets 38 and then down to the bottom of the vessel 12. The coolant then flows upwardly into the reactor core 18 through the lower core plate 20, upwardly along the interior and exterior of the fuel assemblies 16, from the reactor core 18 through the upper core plate 22, and upwardly along the interior and exterior of the guide tube assemblies 28, finally exiting from the reactor vessel 12 through the outlets 40 thereof.

Referring to FIGS. 2-5, each control rod drive mechanism 32, being of the magnetic jack type, supports one control rod cluster assembly 34 (FIGS. 31 and 32) from above within one guide tube assembly 28 (FIG. 33). The control rod drive mechanism 32 basically includes an elongated pressure housing 42, an elongated drive rod shaft 44, movable and stationary gripper assemblies 46, 48, and an electromagnetic actuating assembly 50. The pressure housing 42 is formed of non-magnetic material and has an elongated central passage 52 defined by an elongated central guide sleeve 54 of the housing. The housing 42 is threaded and hermetically sealed to the reactor vessel 12 and supported by the closure head 24 thereof.

The drive rod shaft 44 of the mechanism 32 extends through the hollow passage 52 of the housing 42. The drive rod shaft 44 has multiple ring-like grooves 56 axially spaced apart from one another by predetermined equal distances and circumferentially formed about the shaft 44. By way of example, the grooves 56 are defined on the shaft 44 at ⅝" intervals. One control rod cluster assembly 34 (FIGS. 31 and 32) is connected to the lower end of each drive rod shaft 44, as can be seen in FIG. 1. The number of grooves 56 provided on the rod shaft 44 are sufficient so that the attached control rod cluster assembly 34 can be positioned at any location within the associated fuel assembly 16 at ⅝" intervals or "steps". The total travel of the control rod cluster assembly 34 is 144 inches or 228 steps.

Figure 4:
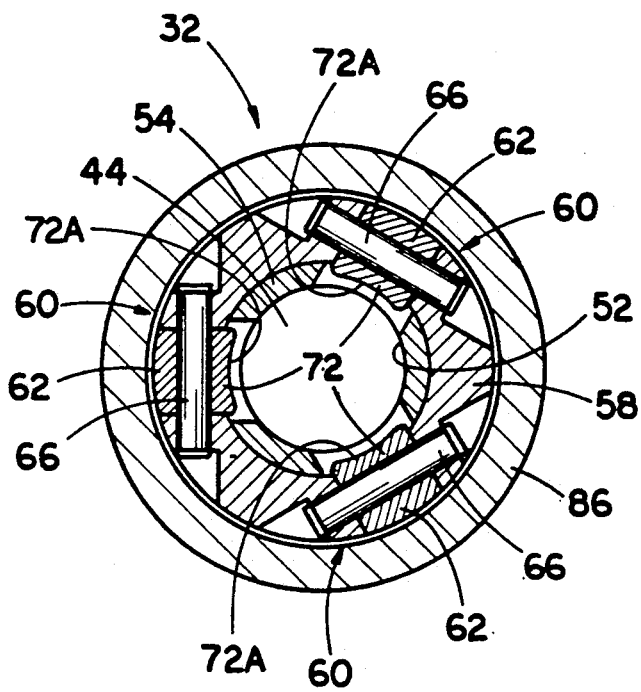
FIG. 4 is an enlarged transverse sectional view of the control rod drive mechanism taken along line 4—4 of FIG. 3.
Figure 5:
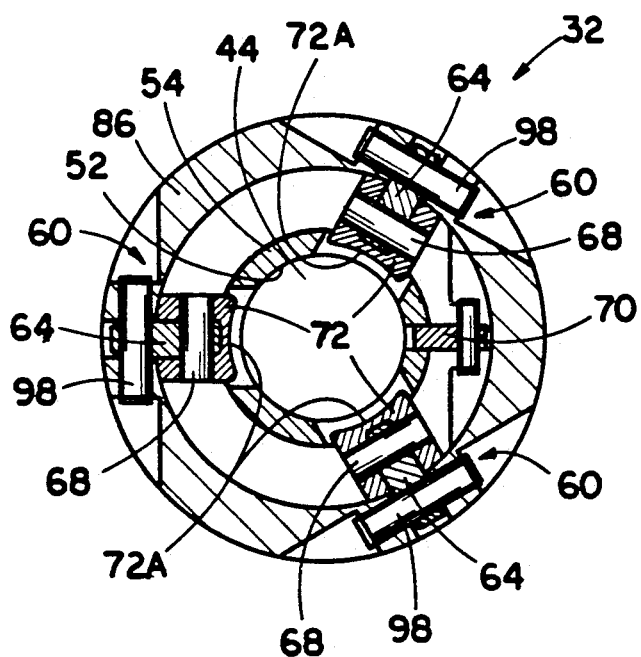
FIG. 5 is another enlarged transverse sectional view of the control rod drive mechanism taken along line 5—5 of FIG. 3.

The movable and stationary gripper assemblies 46, 48 of the mechanism 32 are mounted at the interior of the housing 42. As seen in FIGS. 4 and 5, each gripper assembly 46, 48 includes a support tub 58 attached to the central guide sleeve 54 and a set of latch and linkage arrangements 60. Each set contains three such arrangements 60 angularly positioned 120 degrees apart about the drive rod shaft 44.

Referring to FIGS. 6–11, each latch and linkage arrangement 60 is composed of a latch 62 and a link 64. An upper pivot pin 66 pivotally mounts the latch 62 adjacent its upper end to its respective support tube 58 such that the latch is positioned through longitudinal slots defined in the support tube 58 and central guide sleeve 54 to permit pivotal movement of the latch 62 relative to the drive rod shaft 44. The lower pivot pin 68 pivotally connects the latch 62 adjacent its partially bifurcated lower end to an inner end of the link 64. The partial bifurcation of the lower end of the latch 62 defines a recess 62A for receiving the inner end of the link 64 and contains aligned holes 62B for receiving the lower pin 68 which connects the latch 62 with the link 64. A flat key 70 is also installed in slots in the support tube 58 and guide sleeve 54 for preventing the support tube 58 from rotating relative to the housing 42 and guide sleeve 54.

The latch 62 also has an inwardly projecting tooth 72 defined on its lower end. The tooth 72 has an outer surface 72A with an arcuate shaped profile for mating with and engaging a portion of the drive rod shaft groove 56. In FIG. 6, the latch 62 and link 64 of the arrangement 60 are shown extended toward the drive rod shaft 44 with the latch tooth 72 engaged in one of the circumferential grooves 56 on the shaft 44. FIG. 7 shows the latch 62 and link 64 of the arrangement 60 retracted from the drive rod shaft 44 with the latch tooth 72 disengaged from the one circumferential groove 56 on the shaft 44.

As seen in FIGS. 2, 3 and 12–17, the electromagnetic actuating assembly 50 of the mechanism 32 has components mounted respectively at the exterior and interior of the pressure housing 42. In particular, the actuating assembly 50 includes three independent annular electromagnetic lift coils C mounted about the exterior of the housing 42, namely, an upper coil 74, a middle coil 76 and a lower coil 78. Annular flux rings (not shown) are mounted about the housing 42 radially inward from the coils. The actuating assembly 50 also includes annular upper and lower poles 80, 82 fixedly mounted about the central guide sleeve 54 of the housing 42 in axially spaced relation to one another, and annular upper, middle and lower armatures 84, 86, 88 slidably mounted about the central guide sleeve 54. Upper, middle and lower armature return coil springs 90, 92, 94 encircle the guide sleeve 54. The upper return spring 90 is disposed between the upper fixed pole 80 and upper movable armature 84. The middle return spring 90 is disposed between the upper movable armature 84 and middle movable armature 86. The lower return spring 94 is disposed between the lower fixed pole 82 and lower movable armature 88. A load transfer return spring 96 is disposed between the lower movable armature 88 and the support tube 58 of the stationary gripper assembly 48. The links 64 of the latch and linkage arrangements 60 of the movable and stationary gripper assemblies 46, 48 are pivotally connected at their outer ends by pivot pins 98 to the respective middle and lower movable armatures 86, 88.

Thus, the control rod drive mechanism 32 is a three-coil, electromagnetic jack which raises and lowers the control rod cluster assembly 34 via the drive rod shaft 44. The three coils 74, 76, 78, mounted outside the pressure housing 42, actuate the movable armatures 84, 86, 88 contained within the housing 42. The movable armatures 84, 86, 88 operate the latches 62 of the movable and stationary gripper assemblies 46, 48 which grip the grooved drive rod shaft 44. The latches 62 of the lower stationary gripper assembly 48 are used to hold the drive rod shaft 44 in a desired stationary position. The latches 62 of the upper movable gripper assembly 46, which are raised and lowered by the upper movable armature 84, are used to raise and lower the drive rod shaft 44. Each step of the mechanism 32 moves the drive rod shaft ⅝" (1.58 cm).

More particularly, the latches 62 of the movable and stationary gripper assemblies 46, 48 are actuated and the drive rod shaft 44 is moved vertically by the coordinated operation of the coils 74, 76, 78, poles 80, 82 and armatures 84, 86, 88. When the coils 74, 76, 78 are energized, a magnetic flux field is created which passes through the nonmagnetic pressure housing 42 and couples with the fixed poles 80, 82. Force sufficient to provide vertical motion of the movable armatures 84, 86, 88 is obtained by the solenoid principle.

Referring to FIGS. 12–17, there is illustrated a sequence of steps in raising the drive rod shaft 44 of the prior art mechanism 32 in stepping fashion relative to the pressure housing 42. During normal steady state operation of the reactor 10, the drive rod shaft 44 is held in a stationary position, as shown in FIG. 12. In this mode, called the "hold" mode, only the lower coil 78 is energized. When energized, the lower coil 78 raises the lower armature 88 causing inward pivoting of the lower set of latches 62 of the stationary gripper assembly 48 to engage the drive rod shaft 44. If the current to the lower coil 78 is interrupted, either by choice or by electrical malfunction, the lower armature 88 is released and the latches 62 of the stationary gripper assembly 48 are pivoted to disengage from the drive rod shaft 44, permitting the drive rod shaft to drop and thereby insert the control rod cluster assembly 34 into the nuclear core 18. This same action applies during all phases of the operation of the mechanism 32 and provides for quick shutdown of the reactor 10.

The repositioning, or stepping, of the drive rod shaft 44 is most easily understood by description of the sequence of events which occur during a rod withdrawal step, as shown in FIGS. 13-17. The withdrawal step begins by increasing the current in the lower coil 78. The middle coil 76 is then energized causing the middle armature 86 to raise and the upper set of latches 62 of the movable gripper assembly 46 to cam radially into a position where they can engage the drive rod shaft 44. At this point, however, they are located slightly less than one-sixteenth of an inch below a drive rod groove 56. When the current in the lower coil 78 is then lowered, the stationary gripper assembly 48 drops approximately one-sixteenth of an inch, transferring the load of the drive rod shaft 44 from the latches 62 of the stationary gripper assembly 48 to the latches of the movable gripper assembly 46, as seen in FIG. 13. Continued reduction of lower coil current causes the latches 62 of the stationary gripper assembly 48 to cam outward from the drive rod shaft groove 56 to the position seen in FIG. 14. This action is called the load transfer function and assures that neither set of latches 62 is carrying the full weight of the drive rod shaft 44 during camming in or camming out operations.

Figure 19:
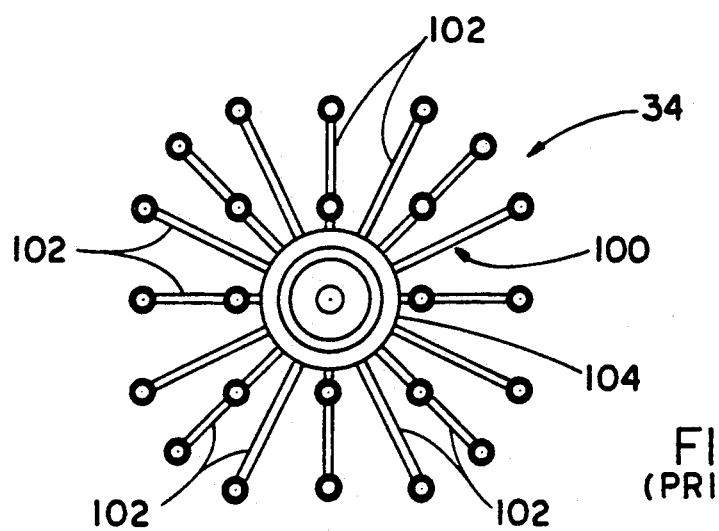
FIG. 19 is a top plan view of the control rod cluster assembly as seen along line 19—19 of FIG. 18.
Figure 18:
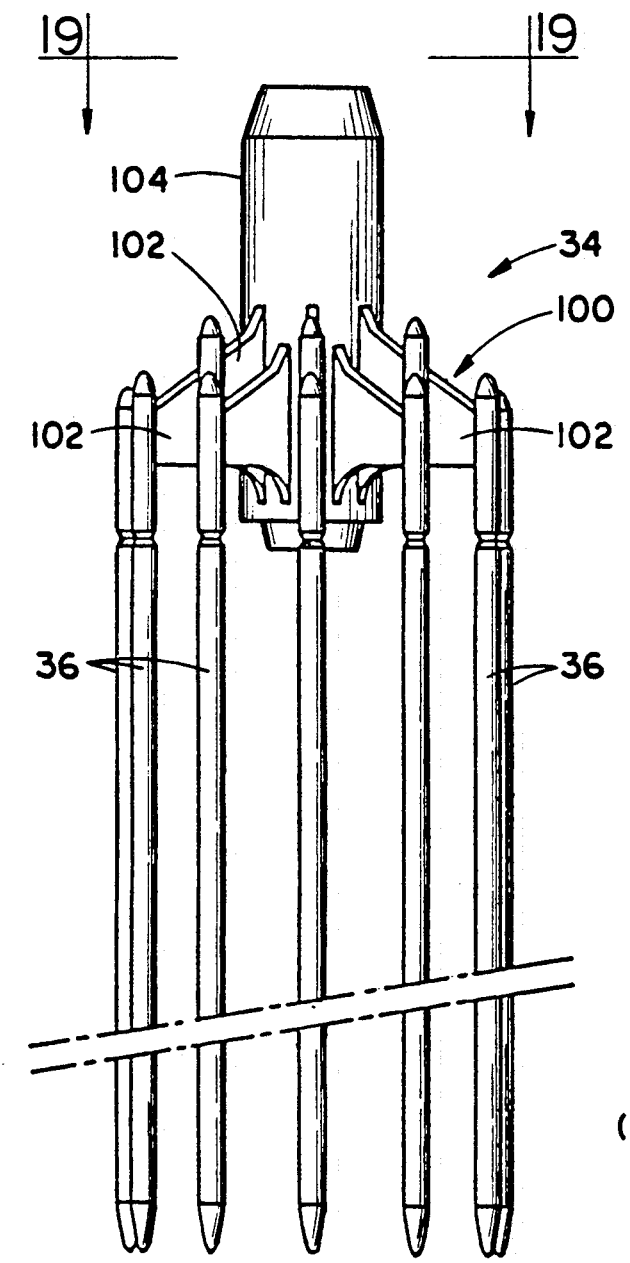
FIG. 18 is a foreshortened side elevational view of a prior art control rod cluster assembly employed in the nuclear reactor of FIG. 1.

As seen in FIG. 14, the drive rod shaft 44 is now being held by the latches 62 of the movable gripper assembly 46 only. The upper, or lift, coil 74 is now energized. This results in raising the upper armature 84 and the movable gripper assembly 46 connected therewith through a step of $\frac{5}{8}$ of an inch, raising the drive rod shaft 44 and attached control rod cluster assembly 34 through the one step, from the position of FIG. 14 to that of FIG. 15. The lower coil 78 is then energized, raising the lower armature 88 as seen in FIG. 16. The latches 62 of the stationary gripper assembly 48 then pull up approximately one-sixteenth of an inch, picking up the drive rod shaft load from the latches 62 of the movable gripper assembly 46. The middle coil 76 is then deenergized and the latches 62 of the movable gripper assembly 46 cam out as seen in FIG. 17. Finally, as also seen in FIG. 17, the lift coil 74 is deenergized and the movable gripper assembly 46 is lowered to its normal position. Referring to FIGS. 18 and 19, there is illustrated in detail the prior art control rod cluster assembly 32 which is raised and lowered in the prior art guide tube assembly 28 by carrying out the above-described stepping action of the drive rod shaft 44 of the control rod drive mechanism 32. The control rod cluster assembly 32 includes a plurality of the control rods 36 and a spider 100 having radially extending flukes 102 connected to the upper ends of the control rods 36. The control rods 36 extend downwardly from the spider 100 and generally parallel to one another. The control rods 36 are arranged in a pattern matched to that of guide thimbles (not shown) in the one of the fuel assemblies 16 above which the cluster assembly 32 is aligned. The spider 100 also has a central cylindrical member 104 by which it is coupled to the lower end of the drive rod shaft 44 of the control rod drive mechanism 32.

Figure 20:
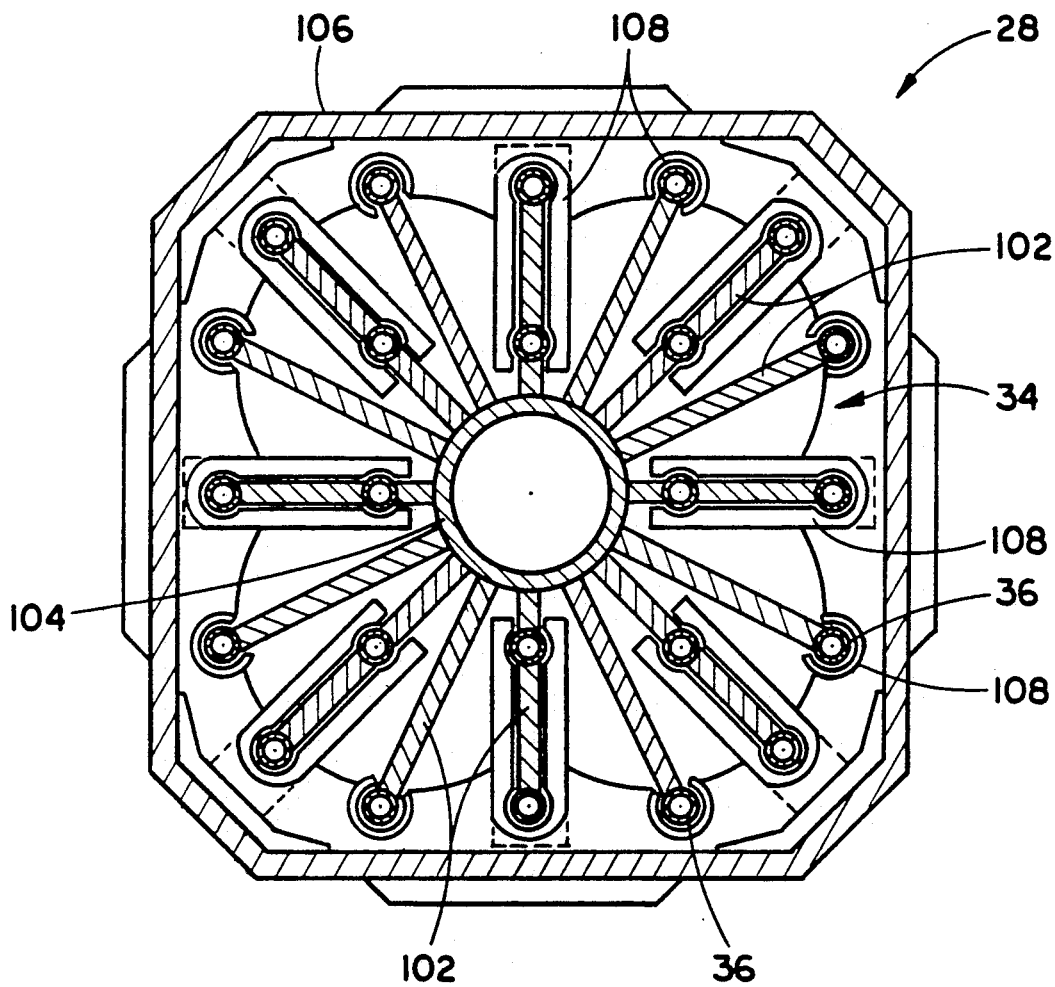
FIG. 20 is an enlarged transverse section of the control rod cluster assembly and guide tube assembly taken along line 20—20 of FIG. 1.

FIG. 20 shows the control rod cluster assembly 32 mounted in the prior art guide tube assembly 28. The guide tube assembly 28 includes an outer tubular housing 106 and a plurality of longitudinally slotted guide tubes 108 mounted internally of the housing by brace plates 110. The slotted guide tubes 108 are arranged in a pattern matched to that of the control rods 36 of the cluster assembly 32 so that the control rods 36 are slidably raised and lowered within the guide tubes 108 by operation of the control rod drive mechanism 32. FIG. 21 illustrates an end 36A of one control rod 36 positioned in one guide tube 108. It is in this region that a wear interface 110 develops between the walls of the control rod 36 and guide tube 108 due to rubbing therebetween caused by hydraulic forces imposed on the control rod 36 by coolant flow upward through the guide tube 108.

FIG. 22 diagrammatically depicts the cluster assembly 34 with its control rods 36 positioned in the guide tubes 108 of the guide tube assembly 28. In FIG. 22, the initial or starting position of the control rods 36 is shown at the start of the fuel cycle of the nuclear reactor 10. In FIG. 23, the position of the control rods 36 is shown after repositioning of the cluster assembly 34 three steps at one time at the end of the fuel cycle, which typically is a twelve month period, in preparation for the next fuel cycle. The control rods 36 are repositioned by operation of the control rod drive mechanism 32, as described earlier, so as to move the drive rod shaft 44 successively through three steps.

Although the three-step repositioning scheme of the prior art avoids the problems caused by random misstepping of the control rod drive mechanism 32, the drawback of the three-step repositioning scheme is that the wear is still poorly distributed throughout the total available clad thickness of the control rod. As an example, assume that a particular nuclear plant has a control rod wear rate that uses 60% of the permissible wear thickness in one fuel cycle. With the three-step repositioning scheme, the control rods would be relocated every fuel cycle so that the permissible minimum level of wear thickness is not exceeded. This effectively "wastes" 40% of the wear thickness at that elevation of the control rods.

Improvements

FIGS. 24-27 diagrammatically depict the sequence of stages in the method of repositioning the cluster assembly 34 relative to the guide tube assembly 28 in accordance with the invention of the cross-referenced application by a single step at each of a plurality of times during each fuel cycle. In the example illustrated, the control rod drive mechanism 32 is operated to move the drive rod shaft 44 and thus the cluster assembly 34 a single step at three separate times. In the case of a twelve month fuel cycle, the single-step repositioning of the cluster assembly 34 might be carried out every month, or twelve times, during a one year fuel cycle, or carried out three times, at four, eight and twelve months, during the twelve month fuel cycle. As stated above, the single-step repositioning of the cluster assembly 34 three times during a single fuel cycle is shown respectively in FIGS. 25, 26 and 27.

By increasing the frequency of the repositioning to more than once per fuel cycle, the wear exposure time due to a misstep is decreased, and the consequences of a misstep are reduced proportionately. The more frequent repositioning better utilizes the control rod clad thickness and/or the wall thickness of the guide tube available for wear. For example, if the control rod cluster assembly is repositioned three times per fuel cycle, the wear would be 20% of the allowable wear per repositioning. Eventually, each wear location could be used five times. With a wear of 20% per repositioning, 100% of the permissible wear thickness would be utilized.

Referring to FIGS. 28-36, there is illustrated one embodiment of an improved latch and linkage arrangement, generally designated 112, in accordance with the present invention. As mentioned in the background section supra, the prior art latches 62 each have either one or a pair of teeth 72 which engage within either a single groove or a pair of adjacent of grooves 56 in the drive rod shaft 44. Because the latches 62 pivotally move in arcuate paths toward and away from the drive rod shaft 44, the teeth 72 are placed at the end of the latch 62 opposite from the pivotal axis of the latch. This latch teeth placement results in the generation of a moment load through the latch which over time tends to cause cracking at the root of the teeth and eventual failure of the latch.

The improved latch and linkage arrangement 112 of the present invention employs a parallel linkage which permits a latch 114 to move along a curvilinear path toward and away from a series of circumferential grooves on the drive rod shaft of the control rod drive mechanism. Because the mounting geometry of the arrangement of the present invention produces uniform movement of the latch 114 toward and away from the drive rod shaft at every point along the length of the latch, a plurality of teeth 116 can be deployed over the entire length of the latch 114 which minimizes the bending moment load through the body 118 of the latch and increases the wear capability of the latch. The elongated body 118 of the latch 114 has a pair of opposite ends 118A, 118B, a pair of opposite sid edges 118C, 118D and a pair of opposite faces 118E, 118F. The plurality of latch teeth 116 are defined along the one side edge 118C, extending in a row between the opposite ends 118A, 118B of the body. A slot 120 is defined into one end 118A of the latch body 118 and a pair of recesses 122A, 122B are defined in the opposite faces 118E, 118F of the body. A pair of longitudinally-spaced transversely-extending upper and lower holes 124A, 124B are formed through the latch body 118 opening within the recesses 122A, 122B and the upper hole 124A intersecting with the slot 120.

The improved latch and linkage arrangement 112 also includes a plurality of links 126, 128 and 130. Each link has a hole 132 through it at each of its opposite ends. A first link 126 is pivotally connected to the latch body 118 by a first pivot pin 134 through the upper hole 124A and pivotally connected to the respective one of the middle and lower armatures 86, 88 of the actuating assembly 50 which is the same as in the prior art. These armatures apply the motive force longitudinally of the latch body 118 between its opposite ends 118A, 118B via the first link 126. Second and third pairs of links 128, 130 are pivotally connected to the latch body 118 and to the respective support tube 58 by second and third sets of pivot pins 136, 138 in a parallel relation to one another so as to define a parallelogram therewith such that when the motive force is applied to the latch body 118 via the first link 126, .the latch body 118 and thereby the latch teeth 116 undergo curvilinear movement toward and away from the engaging or latching position with the plurality of drive rod shaft grooves 56.

Figure 28:
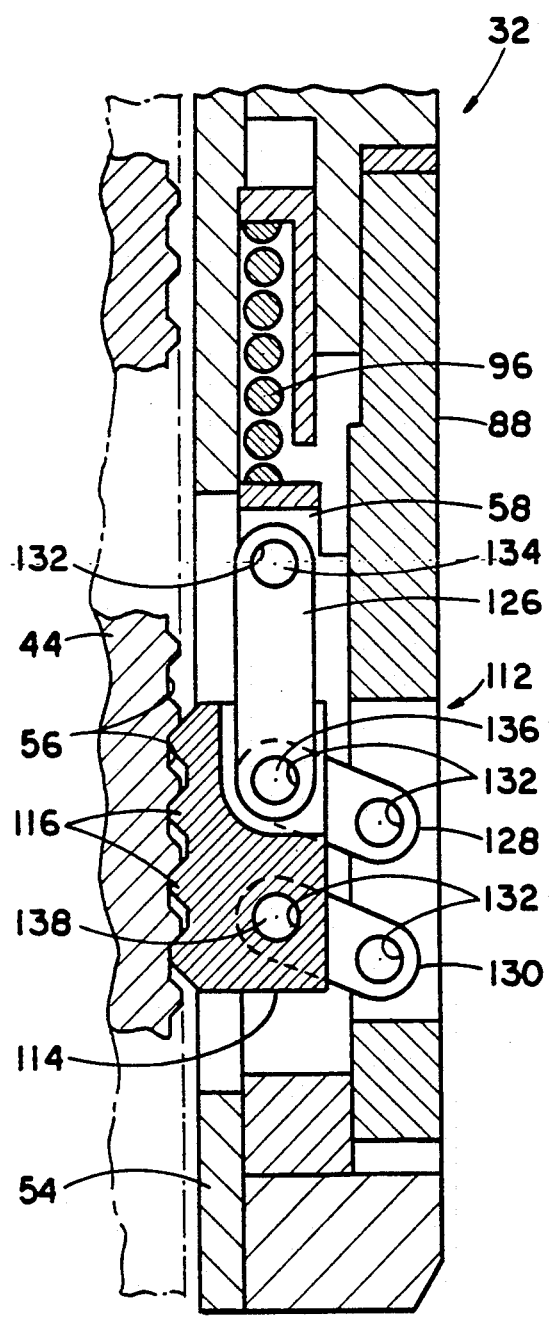
FIG. 28 is an enlarged fragmentary view of the control rod drive mechanism similar to FIG. 6 but illustrating one embodiment of an improved latch and linkage arrangement of the present invention extended toward the drive rod shaft to an engaged position with a plurality of the circumferential grooves on the shaft.
Figure 29:
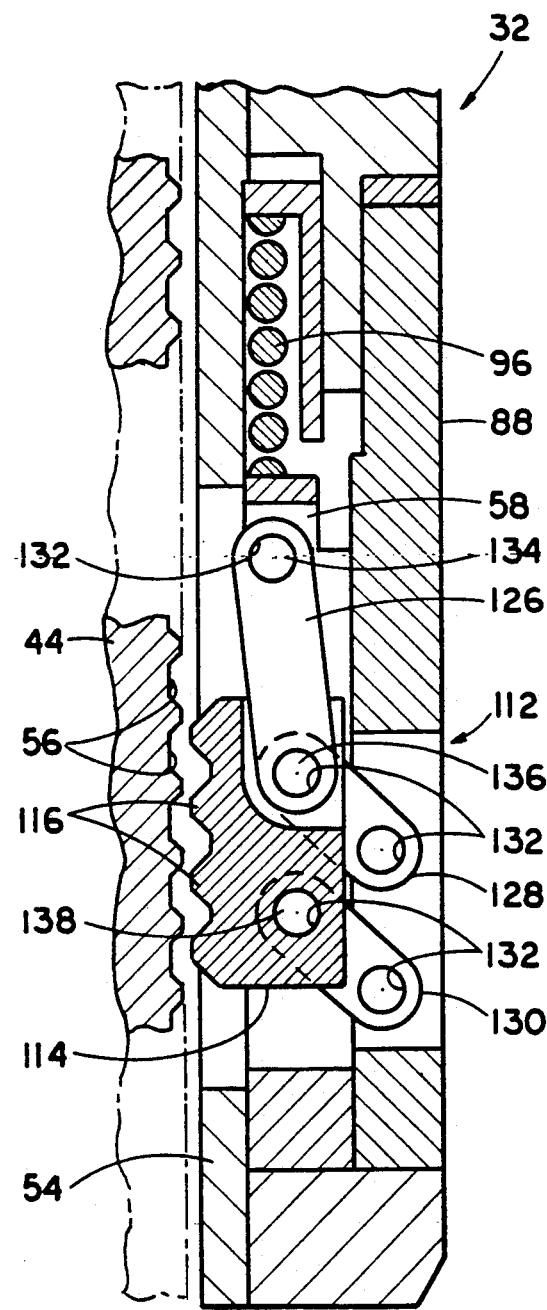
FIG. 29 is an enlarged fragmentary view of the control rod drive mechanism similar to FIG. 7 but illustrating the improved latch and linkage arrangement of the present invention retracted from the drive rod shaft to a disengaged position away from the plurality of circumferential grooves on the shaft.
Figure 35:
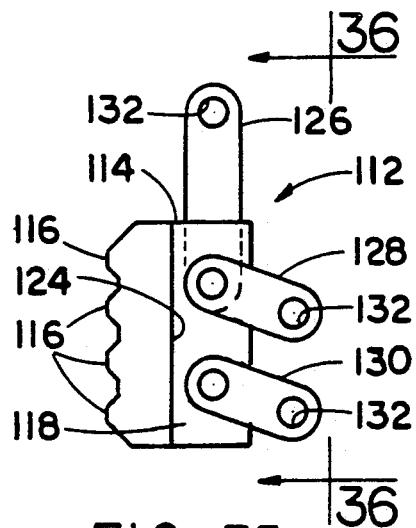
FIG. 35 is a side elevational view of the one embodiment of the improved latch and linkage arrangement of FIGS. 28 and 29.
Figure 36:
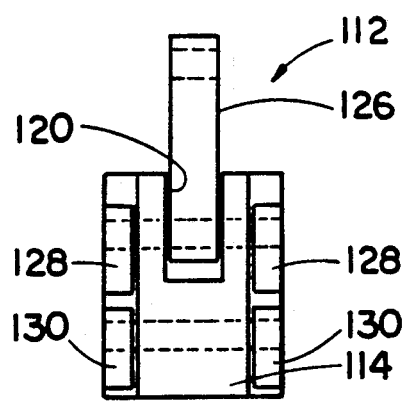
FIG. 36 is a rear elevational view of the improved latch and linkage arrangement as seen along line 36—36 of FIG. 35.

Except for the composition of the latch and linkage arrangement 112, the movable and stationary gripper assemblies 46, 48 of the mechanism 32 are the same as described in the prior art above. Thus, there are three sets of the arrangements 112 angularly positioned 120 degrees apart about the drive rod shaft 44. In FIGS. 28 and 29, the arrangement is seen in respective engaged and disengaged positions relative to a plurality of the circumferential grooves 56 on the drive rod shaft 44.

Figure 37:
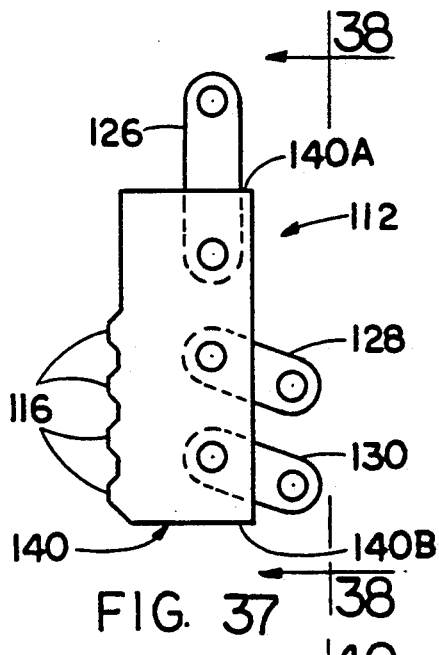
FIG. 37 is a side elevational view of another embodiment of the improved latch and linkage arrangement of the present invention.
Figure 38:
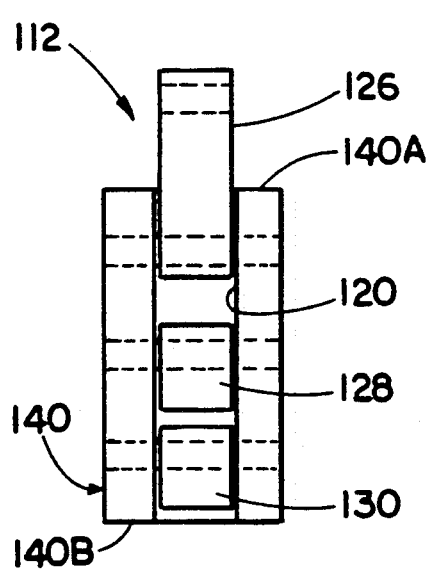
FIG. 38 is a rear elevational view of the improved latch and linkage arrangement as seen along line 38—38 of FIG. 37.

FIGS. 37 and 38 show a second embodiment of the improved latch and linkage arrangement of the present invention. The second embodiment is the same as the first embodiment, except as follows. Instead of the recesses 122A, 122B in the opposite faces 118E, 118F of the latch body 118, the latch body 140 in the second embodiment has the slot 120 extending longitudinally between the opposite ends 140A, 140B of the latch body. Also, a separate hole 124C is provided for the first link 126 and only one each of second and third links 128, 130 are employed.

Figure 39:
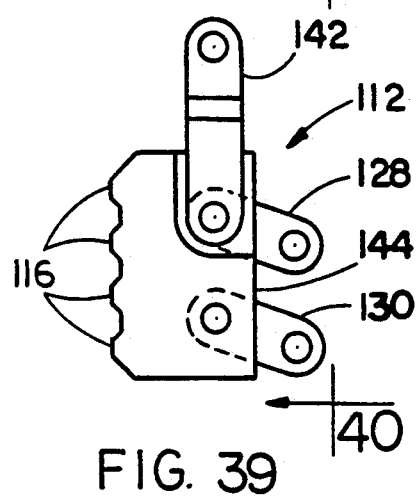
FIG. 39 is a side elevational view of still another embodiment of the improved latch and linkage arrangement of the present invention.
Figure 40:
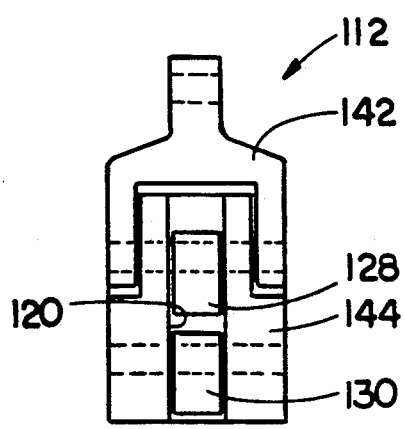
FIG. 40 is a rear elevational view of the improved latch and linkage arrangement as seen along line 40—40 of FIG. 39.

FIGS. 39 and 40 illustrate a third embodiment of the improved latch and linkage arrangement of the present invention. The third embodiment is the same as the second embodiment, except as follows. The first link 142 has a bifurcated end by which it is pivotally mounted to the latch body 144.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. A latch and linkage arrangement in a control rod drive mechanism of a nuclear reactor, said arrangement comprising:
    (a) at least one latch including an elongated body having a pair of opposite ends and a pair of opposite side edges, and a plurality of latch teeth defined along one of said side edges of said body between said opposite ends thereof; and
    (b) a plurality of links, a first of said links pivotally connected to said latch body adjacent one of said ends thereof and pivotally connectable to a member for applying a motive force longitudinally of said body between said opposite ends thereof, second and third of said links pivotally connected to said latch body and connectable to a support member in parallel relation to one another so as to define a parallelogram therewith such that when the motive force is applied to said body via said first link said latch body and thereby said latch teeth undergo curvilinear movement toward and away from a latching position.

2. The arrangement as recited in claim 1, wherein said latch body has a slot at one end and said first link is pivotally connected to said body within said slot.

3. The arrangement as recited in claim 1, wherein said latch body has opposite faces and a recess defined in each opposite face, said second and third links being pivotally connected to said body within said recesses.

4. The arrangement as recited in claim 1, wherein said latch body has a slot extending between opposite ends of said body and said first, second and third links are pivotally connected to said body within said slot.

5. The arrangement as recited in claim 1, wherein said first link has a bifurcated end by which it is pivotally mounted to the latch body.

6. A latch and linkage arrangement in a control rod drive mechanism of a nuclear reactor, said arrangement comprising:
    (a) a support member;
    (b) at least one latch including an elongated body having a pair of opposite ends and a pair of opposite side edges, and a plurality of latch teeth defined along one of said side edges of said body between said opposite ends thereof; and (c) a plurality of links, a first of said links pivotally connected to said latch body adjacent one of said ends thereof and pivotally connectable to a member for applying a motive force longitudinally of said body between said opposite ends thereof, second and third of said links pivotally connected to said latch body and to said support member in parallel relation to one another so as to define a parallelogram therewith such that when the motive force is applied to said body via said first link said latch body and thereby said latch teeth undergo curvilinear movement toward and away from a latching position.

7. The arrangement as recited in claim 6, wherein said latch body has a slot at one end and said first link is pivotally connected to said body within said slot.

8. The arrangement as recited in claim 6, wherein said latch body has opposite faces and a recess defined in each opposite face, said second and third links being pivotally connected to said body within said recesses.

9. The arrangement as recited in claim 6, wherein said latch body has a slot extending between opposite ends of said body and said first, second and third links are pivotally connected to said body within said slot.

10. The arrangement as recited in claim 6, wherein said first link has a bifurcated end by which it is pivotally mounted to the latch body.

* * * * *